United States Patent
Rimboym

Patent Number: 5,762,102
Date of Patent: Jun. 9, 1998

[54] PNEUMATICALLY CONTROLLED NO-BLEED VALVE AND VARIABLE PRESSURE REGULATOR

[75] Inventor: Vladimir Rimboym, Chicago, Ill.

[73] Assignee: Becker Precision Equipment, Inc., Elk Grove Village, Ill.

[21] Appl. No.: 798,123

[22] Filed: Feb. 12, 1997

Related U.S. Application Data

[63] Continuation of Ser. No. 456,965, Jun. 1, 1995, abandoned.

[51] Int. Cl.$^6$ ................................. F16K 31/124
[52] U.S. Cl. .................. 137/492.5; 137/102; 137/492; 137/627.5
[58] Field of Search .................. 137/492.5, 627.5, 137/492, 102

[56] References Cited

U.S. PATENT DOCUMENTS

| | | | |
|---|---|---|---|
| 2,171,613 | 9/1939 | Vance | 137/627.5 X |
| 2,323,839 | 7/1943 | Nixon | 137/492.5 |
| 3,572,359 | 3/1971 | Weise | 137/85 |
| 3,631,878 | 1/1972 | Vander Horst | 137/116.3 |
| 3,664,362 | 5/1972 | Weise | 137/492 X |
| 3,996,965 | 12/1976 | Peters | 137/625.66 |
| 4,084,613 | 4/1978 | Peters | 137/596.18 |
| 4,186,766 | 2/1980 | Snyder | 137/458 |
| 4,217,934 | 8/1980 | Peters | 137/625.66 |
| 4,304,250 | 12/1981 | Snyder | 137/102 |
| 4,325,406 | 4/1982 | Bron | 137/492.5 |
| 4,491,154 | 1/1985 | Peters | 137/625.66 |
| 4,593,712 | 6/1986 | Quartana, III | 137/106 |
| 4,821,776 | 4/1989 | Ariizumi et al. | 137/625.4 |
| 5,158,111 | 10/1992 | Lambert et al. | 137/627.5 |
| 5,244,004 | 9/1993 | Robertson | 137/14 |

OTHER PUBLICATIONS

Becker Precision Equipment, Inc., VRP–SB Auto–Reset Pilot, Brochure.

*Primary Examiner*—Stephen M. Hepperle
*Attorney, Agent, or Firm*—Michael, Best & Friedrich

[57] ABSTRACT

A pneumatically controlled assembly for the no-bleed regulation of the pressure of a gas as it flows in a pressurized line and including two balance valves that are set to respond to variations in pressure in conjunction with a controller valve so as to effectively regulate and maintain the pressure of the gas in the pressurized line. The balance valves are adjusted to maintain a gas tight seal, to open only in the situation when the gas pressure in the line is over the set amount desired, and to automatically close when the pressure in the line has returned to the desired level. The balance valves act in the situation where the pressure in the line changes, either over or under the set pressure. This is accomplished through a sensor mechanism such as a diaphragm. The diaphragm is set to respond to the desired pressure changes and communicates the pressure changes in the line by means, for example, of deflecting a spring. The sensor communicates the pressure change to one or both balance valves.

2 Claims, 3 Drawing Sheets

PNEUMATICALLY CONTROLLED NO-BLEED VALVE AND VARIABLE PRESSURE REGULATOR

This is a Continuation of application Ser. No. 08/456,965, filed Jun. 1, 1995, Entitled "PNEUMATICALLY CONTROLLED NO-BLEED VALVE AND VARIABLE PRESSURE REGULATOR", now abandoned.

FIELD OF THE INVENTION

This invention relates to devices for pneumatic regulation of pressure variation in pressurized gas delivery lines. More particularly balance valves are employed in this invention to activate pressure controllers in a pressurized gas delivery line, thereby causing the pressure in the line to be maintained within a particularly desirable level. This invention results in total pneumatic control over the regulation of line pressure, and during the periods when the system is at steady state, the device of this invention causes no bleed from the controller in this invention.

SUMMARY OF THE INVENTION

A pneumatically controlled assembly is disclosed for the regulation of the pressure of a gas as it flows in a pressurized line. The device is comprised of at least two balance valves that are set to respond to variations in pressure in conjunction with a controller valve so as to effectively regulated and maintain the pressure of a gas in a pressurized line.

The balance valve devices of this invention are comprised of at least one diaphragm, valve stem, balance valve spring, piston and means for communicating with each other. The balanced valves are adjusted to maintain a gas tight seal, to open only in the situation when the gas pressure in the line is over the set amount desired and are set to automatically close when the response from the pressurized line indicates that the pressure in the line has returned to the desired level.

The balance valves act in the situation where the pressure in the line changes, either over or under the set pressure. This is accomplished through a sensor mechanism such as a diaphragm. The diaphragm is set to respond to the desired pressure changes and communicates the pressure changes in the line by means, for example, of deflecting a spring. The sensor communicates the pressure change to one or both balance valves.

The first balance valve is connected to an exhaust line and the second balance valve is connected to a supply line in conjunction with the pressurized gas line. The particular designation of the balance valves is not critical, only the response of one or the other balance valves is required as the pressure in the gas delivery line changes.

The device also contains a mechanical communication with a controller valve that regulates the pressure of flow in a pressurized gas line. The mechanical communication between the invention and the controller is called an actuator. The actuator is a piston or diaphragm that is loaded with pneumatic pressure, which pressure is opposed by a spring in the actuator. The spring reacts to the pressure such that the any change in the pneumatic pressure will result in the actuator moving to a diffferent and unique position for each such pressure change.

During the period where the system is at steady state, or when there is no change in the pressure of the gas in the delivery line, the balance valves are set so as to cause no bleeding of gas from the delivery line to the ambient environment.

Figure 1:
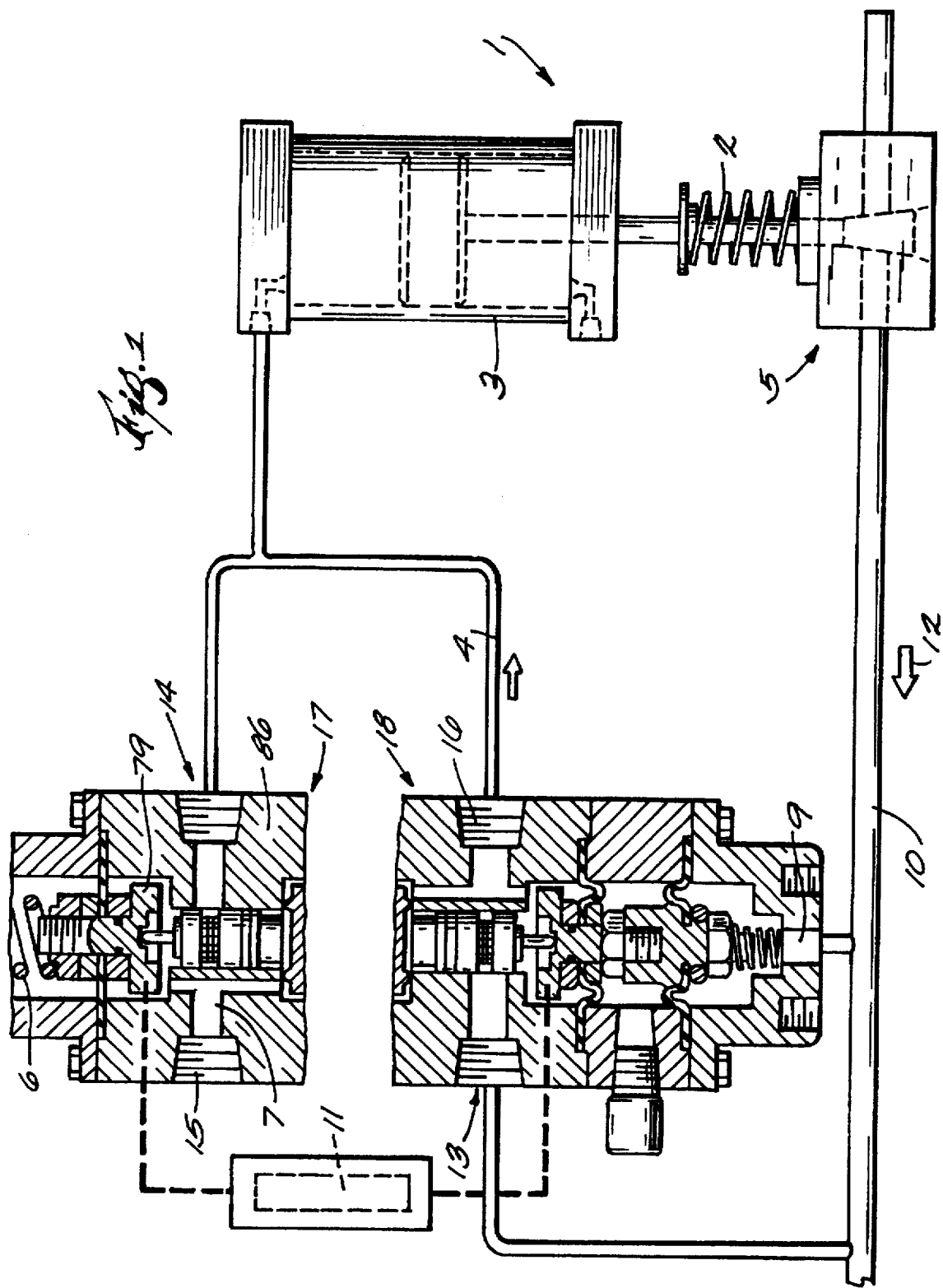
FIG. 1 is a schematic drawing of the pressure controller system in conjunction with gas delivery line sensors, actuators and controllers.

Before the embodiment of the invention is explained in detail, it is to be understood that the intention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein is for the purpose of description, and should not be regarded as limiting.

BACKGROUND OF THE INVENTION

Pressure regulators equipped with variable pressure regulator pilot valves are used as operating regulators, monitors, stand-by regulators and relief valves. With equal success, pilots are operating ball valves, plug valves and globe valves.

Current valve regulators are designed to maintain a desired pressure in a delivery line require an amount of "bleed gas" be discharged from the regulating valve during all phases of operation. Bleed gas is that gas that is discharged or bled from the delivery line during the operation of a controller valve.

At present, valves designed to maintain the desired pressure of fluid in a delivery line operate with a constant "bleed" from the valve. This is wasteful and environmentally undesirable. Environmental costs and problems are caused by discharge of pollutants to the air. Bleed gas from natural gas pipelines to the atmosphere year after year only adds to this problem. Overall, industry estimates place the discharge of natural gas to the atmosphere from a single controller operating with constant bleed to the atmosphere, in excess of 300,000 scf per year. (SCF is defined as standard cubic foot, i.e. at standard conditions.) The no-bleed controller valve of this invention can eliminate this and lead us to a future with cleaner air.

The natural gas, oil, chemical and other industries use a variety of regulators to control pressure levels in delivery lines. Controller valves generally are comprised of a sensing element which responds to the fluid pressure in a pressurized process or gas delivery line. The sensing element communicates with the controller valves when a change in the pressure in the line occurs.

Prior art devices employ pilot valves which discharge gas that is bled to the atmosphere. The bleed of gas from the line can have undesirable environmental effects, and increases the cost of gas to the end user due to the amount of gas lost in the delivery process. The present invention can be fitted to result in no bleed of gas to the atmosphere under any circumstances. In the alternative, the present device results in bleed gas only during the very limited periods of adjustment of the line pressure.

The advantage of zero bleed is obvious in light of recent developments in environmental law requiring the limitation of discharge of certain types of gas to the environment. In addition, the curtailment of discharge of gas to the environment also has obvious cost savings.

ADVANTAGES OF THE PRESENT INVENTION

The present invention is a purely pneumatic system. There is no need to employ any electronic regulation of flow as is commonly accomplished using, for example, solenoid valves. This advantage allows this invention to be used in conjunction with otherwise explosive gasses, such as natural gas or methane.

Other no-bleed systems exist that require digital input. These systems require the input of electronic energy and are thus not as suitable as the present invention for the regulation of flow in conjunction with the transport of flammable gasses such as natural gas.

The present invention also allows the operator to accurately set the valve response to respond at an exact selected pressure or to respond within a particular range of pressures.

A further advantage of the present invention is that it is powered by line pressure. Unlike other systems, the system is not dependent upon a mechanical actuator. This avoids problems of unreliability due to the ambient temperature around the regulator. At temperature extremes, the materials that are used to form mechanical actuators can seize or become unreliable.

The present invention is designed to discharge bleed gas only during the operative phase or when the line pressure is actually being adjusted for regulation of line pressure. That is, during the steady state operation of the system, or when line pressure is maintained at a constant pre-determined level, there is no bleed gas discharge. Any bleed gas which would otherwise be discharged to the atmosphere can be captured and delivered back to the delivery line, provided the difference between the upstream and downstream pressure is sufficient to operate the control valve actuator.

The system is designed to be installed or retrofitted into any line wherein a steady line pressure is desired. The device that is the subject of this invention is designed to be used particularly in the natural gas industry, but will find application in any field where limitation of discharge of bleed gas is desired or where complete pneumatic control of line pressure is desired.

DETAILED DESCRIPTION OF THE INVENTION

The present invention is designed to be installed in conjunction with a pressurized gas delivery line wherein a constant pressure is desired to be maintained in the pressurized line. The application of this invention is useful for natural gas delivery lines. It is most preferred that the gas in the delivery line be non-caustic to prevent adverse effects to the valve mechanism as described in this, the most preferred embodiment. Other configurations of the regulator mechanism are possible wherein any portion of the device that would be adversely affected by caustic substances is configured from a material that would not suffer degradation as a result of exposure to the particular gas to be delivered.

The side of the single acting cylinder which contains the operative balance valve regulator mechanism is loaded through with supply gas to one balance valve (the supply balance valve) assembly with supply gas from the inlet or supply gas line. The same side is also unloaded through a second balance valve assembly, the exhaust balance valve. Both balanced valves are precisely and simultaneously adjusted.

During the balanced state, at which the gas line being regulated is transmitting gas at the desired constant gas pressure, both balance valves are fully closed. This configuration maintains the desired pressure against the control spring to achieve equilibrium. At any position of the control valve, the balance valves have only one unique and desired position. When the balance valves are set at the desired position, the force of the control spring is exactly equal to the force produced by the measured variable pressure as measured at the gas delivery line. At this position the balance valves are both in a fully closed position, which results in no bleed from the system. The line pressure is maintained at the desired pressure with no bleed from either balance valve. The balance valves of this device open only when the pressure in the line fluctuates from the predetermined pressure, and only at this point to the balance valves act to trigger the line control valve to open or close so as to regulate the pressure in the gas delivery line.

When the balance valves are at their fully closed desired position, there is no offset in the measured variable of the gas pressure. (The form measured variable refers to the measured gas line pressure.) If equilibrium is disturbed, the balance valves function to cause the control value to open or close, to return the flow to the proper pressure. After this function is completed, the balance valves return to their set point of zero discharge. This is accomplished using the pneumatic pressure in the cylinder actuator. The entire system operates using pneumatic pressure alone.

DETAILED DESCRIPTION OF THE PREFERRED EMBODIMENT

The present invention has two pneumatic control elements, i.e. balance valves, which can be adjusted simultaneously using a mechanical linkage. When the system is operating at the set pressure, the balance valves are closed and balanced, and there is no discharge gas. This is the point of steady state operation and the control valve is set to the desired line pressure.

Referring generally to FIG. 1, the following is a general description of installation of the device. This description is designed to illustrate the device, as installed in conjunction with a flow pressure regulator system.

At installation, the balance valves 17 and 18 must be adjusted to achieve optimal operation of the invention. In installation, the supply regulator control valve 5 is adjusted to the designated pressure. The valve at the measured variable pressure point 9 line is then closed (this will be the supply line at 10). The measured variable gauge to a line is adjusted using false signal values from both a false signal supply valve and a false signal bleed valve. The measured variable line 10 must remain closed in this operation.

The adjusting link control spring 11 is then adjusted to act in conjunction with the balance valves. The control spring 11 is set in mechanical communication with the control valve 5 that increases or decreases the flow in the line 10 as desired. Control valve 5 may be selected from many that are available in the market which are appropriate for the material in the line.

The actuator 2 is selected from any that are available in to the practitioner of this invention. The actuator 2 used with this invention can be selected from a variety suitable for use with a pressurized gas delivery line, and is generally comprised of a cylinder, piston or diaphragm working against an an actuator spring and mechanical linkage to a valve for regulation of a gas flow, and are generally comprised of a cylinder, piston or diaphragm and linkage to a valve for regulation of a gas flow.

The device may then be further adjusted in accordance with the desired response sensitivity of the regulator. This operation will allow the device to respond at the exact pressure differential detected by the device, or will allow the operator to use a "deadband", where no response is required within a pre-determined range of variation in the measured variable pressure in the supply gas line.

The operation of the present invention is set forth in the schematic diagram of FIG. 1. In this description the term "gas" is used for any fluid that is transmitted through a flow line, and may be, for example, natural gas, methane, or air.

Gas flow (shown directionally as 12) is directed along the flow line 10 and is directed through a control valve 5. The control valve directs the gas into the line 10 at a pre-determined pressure. The gas passes along to a measured variable pressure point at the variable pressure gauge 9.

The supply gas 12 is loaded into the regulator of this invention to the supply balance valve 18 by first passing through a supply speed controller 13.

The system is set to regulate gas flow by determining the flow desired through the line 10. The supply balance valve 18 is adjusted along with the exhaust balance valve 17. The speed of flow through the balance valve assembly is modulated by the supply speed controller 13 and the exhaust speed controller 14, respectively. Supply output pressure is measured at 16. Exhaust output pressure is measured at 15.

Gas pressure is determined at the measured variable pressure point 9. Balance valves 17 and 18 are set to remain closed so long as the measured variable pressure remains constant.

If the measured variable pressure rises above the set point, the supply balance valve 18 will open while the exhaust balance valve 17 stays closed. The output pressure in the output pressure line 4 will decrease and the control valve 5 will close, thereby decreasing the flow in the supply line 10. The output pressure as measured at 16 will have a higher value and be in equilibrium with the actuator spring 2.

If the measured variable pressure falls below the set point as measured at 9, the exhaust balance valve 17 will open while the supply balance valve 18 remains closed. The output pressure as measured in the output line 4 will be reduced, the actuator 3 will cause the control valve 5 to open, thereby increasing the flow in feed line 10. This results in the measured variable pressure measured at 9 returning to the previous set point.

If one of the balance valves remains open, the output pressure measured at the actuator mechanism 1 will continuously change depending on which balance valve is open. If the exhaust balance valve 17 remains open, the output pressure will decrease as measured at the actuator mechanism and the line pressure in supply line 10 will be caused to increase as the actuator spring 2 causes the control valve 5 to open. This process will continue until the control valve 5 reaches the set point. Then the exhaust balance valve 17 will close and the control valve 5 will remain stationary.

Conversely, if the supply balance valve 18 remains open while the exhaust balance valve 17 remains closed, the output pressure measured at the actuator mechanism 1 will increase and the line pressure in supply line 10 will decrease as the actuator spring 2 causes the control valve 5 to close. This process will continue until the control valve 5 reaches the set point. Then the supply balance valve 18 will close and the control valve 5 will remain stationary.

The adjusting link 11 is used to set the valves according to the flow desired in the line 10. The control spring 6 is set to maintain line pressure. The control spring acts to maintain the balance valves 17 and 18 in the desired position.

All of the foregoing regulation of the line pressure by means of opening the appropriate balance valve is accomplished using the pressure of gas stored in the actuator portion of the mechanism 1. The device is configured so that the only force required in order to open and operate the valve mechanism is that required to operate a small valve spring.

Figure 2:
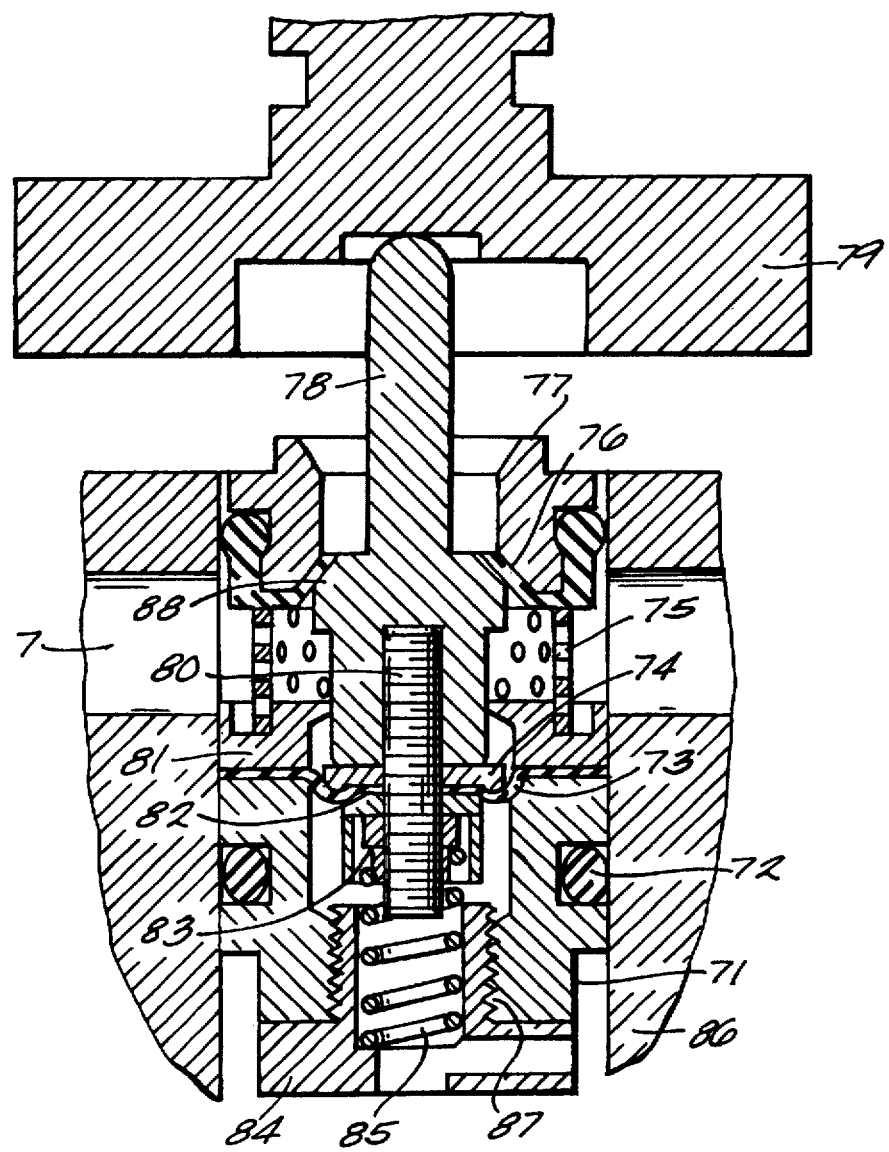
FIG. 2 is a schematic drawing of the balance valve mechanism portion of the invention.
Figure 3:
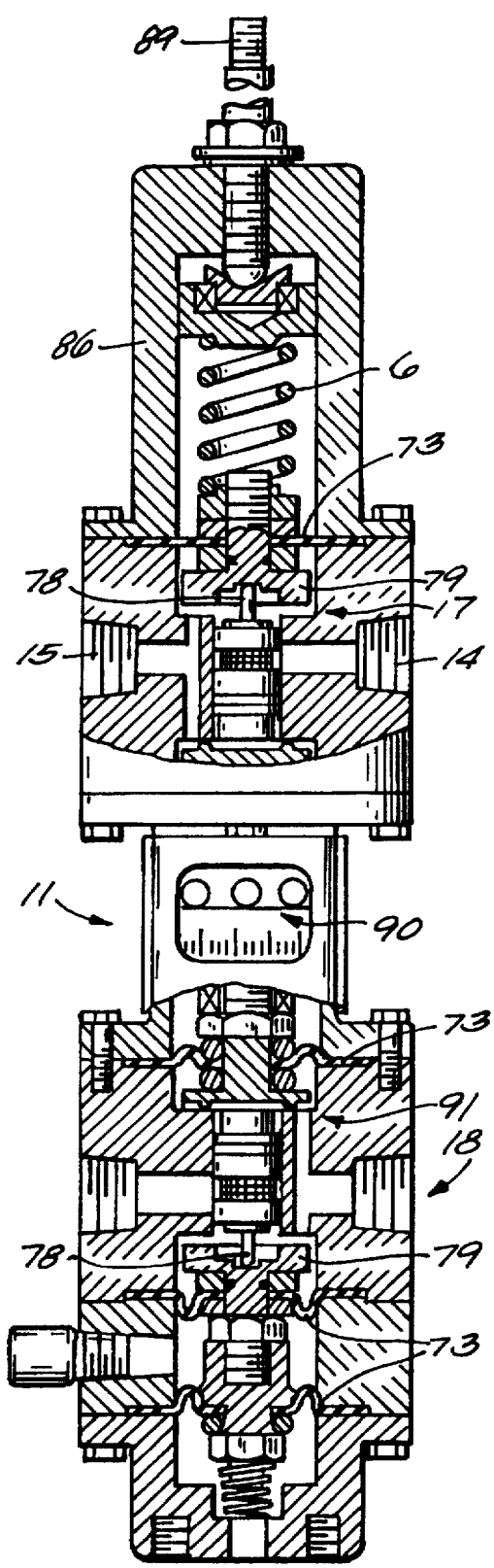
FIG. 3 is a diagram of the valve assembly portion of the invention.
Figure 3A:
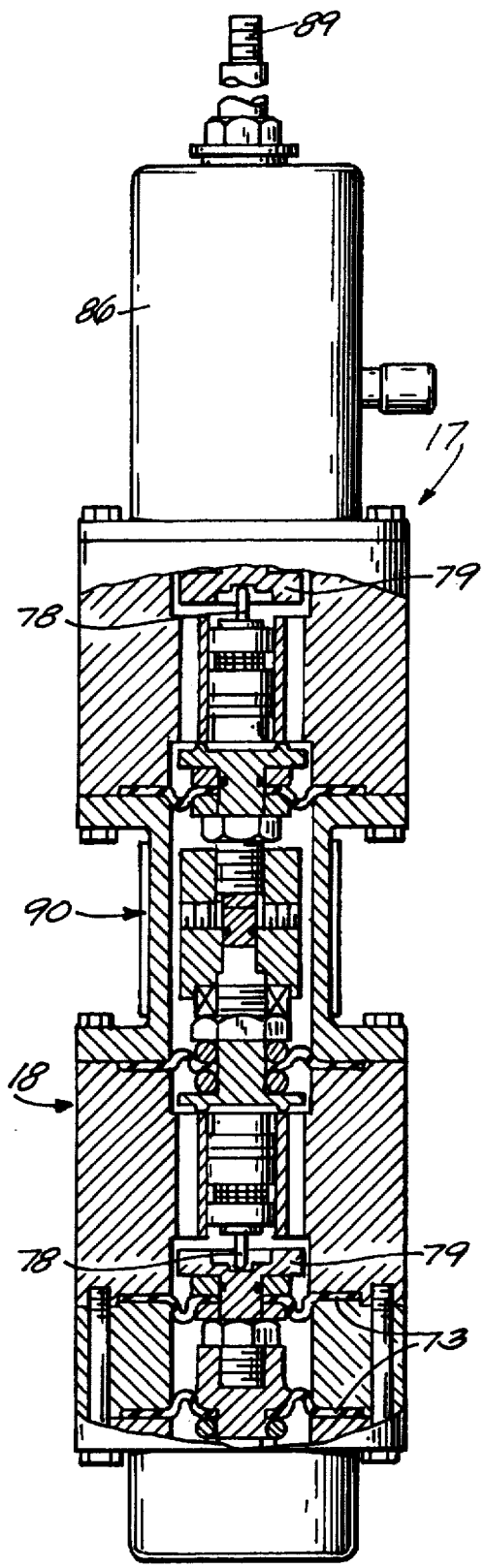

Turning now to FIGS. 2 and 3, the assembly of the balance valves is discussed. Both the exhaust balance valve 17 and the supply balance valve 18 are assembled in like fashion. It is in connecting these valves to the supply or exhaust line (respectively) that determines the setting and adjustment of these valves.

The valve assembly is designed to be installed as new equipment or retrofitted into an existing line assembly. The valve casing 86 contains the balance valve mechanism (17 or 18 as appropriate).

The valve stem 78 is in mechanical communication with the piston depressing mechanism 79. The valve stem 78 is solid and is constructed from stainless steel. The balance valve body 71 has an internally threaded lower extant 87 for sealably receiving the valve mechanism into the valve back flange 84. The particular configuration of the balance valve assembly may be modified in accordance with the requirements of the application of the device.

The back flange 84 is designed to seal the balance valve to prevent leakage of gas. The back flange 84 has within a central opening a spring 85 that communicates between the back flange and the balance valve spring nut 83.

Within the balance valve body is an O ring 72 designed to further seal the valve assembly. The balance valve spring nut 83 is tightened against the balance valve washer 82 which is located immediately adjacent to the balance valve diaphragm. The balance valve washer 82 is tightened to hold the balance valve diaphragm 73 against the back washer 74.

The balance valve diaphragm 73 is made from rubber (available from Palmer-Chenard of New Jersey) or other suitable material. The balance valve diaphragm can be constructed of any material that will not be adversely affected by interaction with the supply gas, such as methane. It is anticipated that the diaphragm would not be adversely affected by gases such as compressed air in any event. The back washer 74, balance valve diaphragm 74 and balance valve washer 82 are designed to fittably receive the balance valve stud 80 which is threadably received into the lower portion of the valve stem 78. This connection allows the valve stem 78 to move within the valve body as regulated by the valve spring 85.

The valve stem 78 is designed to have a collar 88 area which is shaped as one piece with the valve stem 78. The collar area is designed to fittably meet the valve seat surface 76. The valve seat surface is formed from rubber which is backed with brass to form the valve balance seat 77. When the valve is set for steady state operation, the configuration of the valve stem collar 88 meets the valve balance seat 76 thereby preventing any gas passing through the passage (either supply or exhaust). This results in zero bleed during steady state, as shown in the adjustment of the valve in this FIG. 2.

The passage for flow 13 also has within it a perforated spacer 75 designed to allow the flow of gas to the are of the valve balance seat 77.

FIG. 3 shows the two balance valves in the assembly of the balance valve portion of this invention. The control spring 6 is shown in mechanical communication with the exhaust balance valve 17. In the practice of this invention, the connection of the balance valves can be reversed, i.e. the supply and exhaust balance valves will function interchangeably depending upon the manner in which the invention is fitted with a pressurized line.

The device is adjusted using the adjusting screw 89. This adjusting screw ensures that the balance valves 17 and 18 are set so that there is no bleed of pressurized line gas during the operation of the device at steady state, or when the pressurized line pressure is at the desired level.

When the pressurized line pressure varies from the desired level, only one balance valve is opened, the piston depressing mechanism 79 causes only that balance valve that regulates the raising or the balance valve that operates to lower line pressure to function. That is, either the supply 18 or exhaust 17 balance valve will open, but not both.

The adjusting drum 90 acts as the adjusting link 11, above. The adjusting drum communicates between the balance valves 17 and 18. The adjusting drum 90 is a mechanical link between the piston assembly 91, and will lengthen or shorten the distance between the pistons 91 and each balance valve stem 71. It is this adjustment of the adjusting drum to adjust the two balance valves simultaneously.

All metal parts of this invention are available from Becker Precision Equipment, of Elk Grove, Ill.

At steady state, when the line pressure is at the desired level, the piston is away from the valve and the valve spring 85 keeps the valve 78 against the valve balance seat 76. Pressure is simultaneously applied to the area of the valve seat 76 and the back washer 74 The forces created by the inlet pressure are equal and opposite to the cylinder pressure and therefore the valve is balanced.

Cylinder pressure is that pressure that is applied to the area above the seat and to the far side of the valve diaphragm 73. During the response phase, the piston 79 depresses the valve 78 causing the valve to open. Pressures are then equalized according to the setting of the valve regulation mechanism discussed above and the balance valve returns to the steady state setting The device can be set to respond at the desired pressure in the line, or the device can be set to function at a slightly different pressure, creating a dead band of non-response, depending on the exacting demand for regulation of line pressure.

While a preferred embodiment of the invention has been described, by way of example, various modifications will become apparent to one of ordinary skill in the art. Thus, the scope of the invention is to be limited only by the spirit and scope of the following claims.

What is claimed is:

1. A pneumatically controlled pilot valve system for controlling the pressure of gas supplied through a delivery line, the delivery line having a flow control valve, and the pilot valve system comprising:

a gas pressure operated controller connected to the flow control valve for controlling operation of the flow control valve, the gas pressure operated controller including a pressure chamber and being operable to control the flow control valve in response to changes in gas pressure in the pressure chamber;

means for controlling the fluid pressure in the pressure chamber of the gas pressure operated controller, the means for controlling fluid pressure including:

a first balance valve connected to the fluid pressure chamber for controlling supply of gas from the delivery line to the fluid pressure chamber, the first balance valve including a first valve body, a first valve assembly in the first valve body and for controlling the flow of gas from the delivery line to the pressure chamber, the first valve assembly including a first valve seat and a first valve member, the first valve seat and the first valve member being movable with respect to one another, means for selectively causing movement of the first valve member away from the first valve seat in response to the pressure in the delivery line, a second balance valve connected to the pressure chamber for exhausting fluid pressure from the pressure chamber, the second balance valve including a second valve body and a second valve assembly in the valve body and for controlling exhaust of gas from the pressure chamber, the second valve assembly including a second valve seat and a second valve member, the second valve seat and second valve member being relatively movable with respect to one another, means for selectively causing movement of the second valve member away from the second valve seat in response to the pressure in the delivery line, and adjustable connecting means for connecting the first valve seat to the second valve seat and for supporting the first valve seat in a selected spaced apart position with respect to the second valve seat, and the adjustable connecting means including means for adjusting the relative space between the first valve seat and the second valve seat so as to provide for zero bleed of gas through the first and second valves in a steady state condition.

2. A pneumatically controlled pilot valve system for controlling the pressure of gas supplied through a delivery line, the delivery line having a flow control valve, and the pilot valve system comprising:

a gas pressure operated controller connected to the flow control valve for controlling operation of the flow control valve, the gas pressure operated controller including a pressure chamber and being operable to control the flow control valve in response to changes in gas pressure in the pressure chamber;

means for controlling the fluid pressure in the pressure chamber of the gas pressure operated controller, the means for controlling fluid pressure including:

a first balance valve connected to the fluid pressure chamber for controlling supply of gas from the delivery line to the fluid pressure chamber, the first balance valve including a first valve body, a first valve assembly in the first valve body and for controlling the flow of gas from the delivery line to the pressure chamber, the first valve assembly including a first valve seat and a first valve member, the first valve seat and the first valve member being movable with respect to one another, means for selectively causing movement of the first valve member away from the first valve seat in response to the pressure in the delivery line, a second balance valve connected to the pressure chamber for exhausting fluid pressure from the pressure chamber, the second balance valve including a second valve body and a second valve assembly in the valve body and for controlling exhaust of gas from the pressure chamber, the second valve assembly including a second valve seat and a second valve member, the second valve seat and second valve member being relatively movable with respect to one another, means for selectively causing movement of the second valve member away from the second valve seat in response to the pressure in the delivery line, and adjustable connecting means for mechanically connecting the first valve assembly to the second valve assembly and for adjustably supporting the first valve member with respect to the first valve seat and the second valve member with respect to the second valve seat, so as to provide for zero bleed of gas through the first and second valves in a steady state condition.

* * * * *